United States Patent
Egedal et al.

(10) Patent No.: US 9,257,843 B2
(45) Date of Patent: Feb. 9, 2016

(54) CONTROLLER, WIND PARK AND CONTROL METHOD

(75) Inventors: Per Egedal, Herning (DK); Sathees Kumar, Herning (DK); Kaj Skov Nielsen, Issaquah, WA (US)

(73) Assignee: SIEMENS AKTIENGESELLSCHAFT, München (DE)

(*) Notice: Subject to any disclaimer, the term of this patent is extended or adjusted under 35 U.S.C. 154(b) by 733 days.

(21) Appl. No.: 13/534,256

(22) Filed: Jun. 27, 2012

(65) Prior Publication Data

US 2013/0002211 A1 Jan. 3, 2013

(30) Foreign Application Priority Data

Jun. 29, 2011 (EP) .................................. 11171898

(51) Int. Cl.
| | |
|---|---|
| H02J 1/10 | (2006.01) |
| H02J 3/16 | (2006.01) |
| G05F 1/70 | (2006.01) |
| H02J 3/18 | (2006.01) |
| H02J 3/38 | (2006.01) |

(52) U.S. Cl.
CPC ... *H02J 3/16* (2013.01); *G05F 1/70* (2013.01); *H02J 3/1828* (2013.01); *H02J 3/386* (2013.01); *Y02E 10/763* (2013.01); *Y02E 40/34* (2013.01)

(58) Field of Classification Search
CPC .............. G05F 1/70; H02J 3/386; H02J 3/16; H02J 3/1828; Y02E 10/763; Y02E 40/34
USPC .......................................................... 307/43
See application file for complete search history.

(56) References Cited

U.S. PATENT DOCUMENTS

| | | | |
|---|---|---|---|
| 7,808,126 B2 * | 10/2010 | Stiesdal | ........................ 307/84 |
| 2008/0106099 A1 | 5/2008 | Futami | |
| 2009/0096211 A1 | 4/2009 | Stiesdal | |

FOREIGN PATENT DOCUMENTS

| | | |
|---|---|---|
| CN | 101521388 A | 9/2009 |
| DE | 102008048258 A1 | 4/2010 |
| EP | 2108828 A2 | 10/2009 |
| GB | 2410386 A | 7/2005 |

* cited by examiner

*Primary Examiner* — Hal Kaplan

(57) ABSTRACT

Described is a controller, wherein the controller is adapted: to control a transformation ratio of a park transformer of a wind turbine park including wind turbines connected to a first node. The park transformer is connected between a first node and a second node which is connected to a utility grid to which electric energy produced by the wind turbines is to be delivered. Further a wind park and a control method are described.

19 Claims, 6 Drawing Sheets

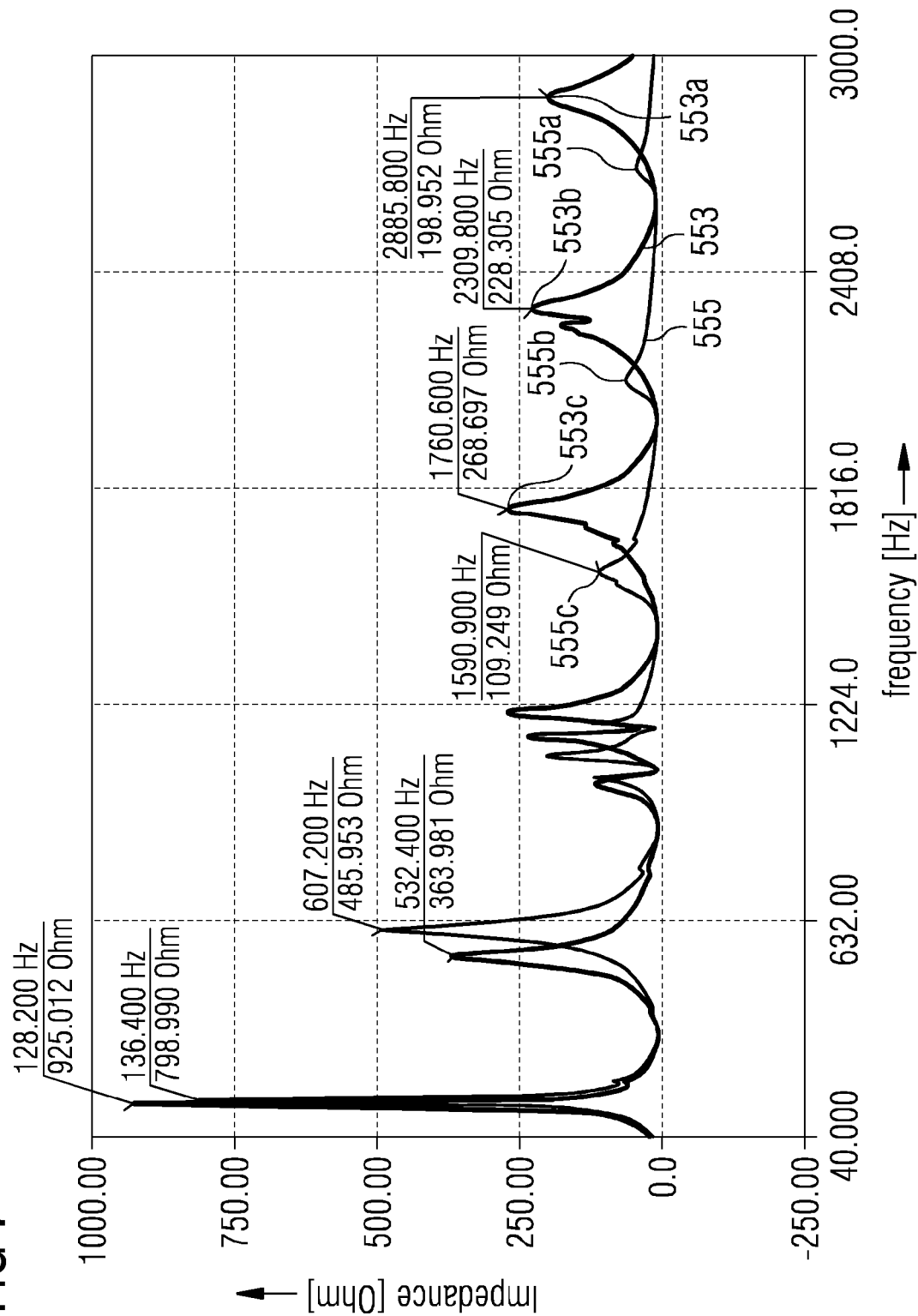

US 9,257,843 B2

CONTROLLER, WIND PARK AND CONTROL METHOD

CROSS REFERENCE TO RELATED APPLICATIONS

This application claims priority of European Patent Office application No. 11171898.7 EP filed Jun. 29, 2011. All of the applications are incorporated by reference herein in their entirety.

FIELD OF INVENTION

Disclosed are a controller, in particular a controller for controlling a park transformer, a wind park and a control method for controlling a park transformer.

ART BACKGROUND

A wind farm or a wind park may comprise one or more wind turbines which convert mechanical energy contained in wind to electrical energy. The wind turbines may be connected to a point of common coupling (PCC) at which point or node a number of electrical conditions or properties must be satisfied. In particular, the electrical properties reactive power Q, voltage V and power factor cos(φ) at the point of common coupling may satisfy particular requirements.

EP 2 108 828 A2 discloses a wind farm collector system loss optimization, wherein a collector system includes a plurality of transformers connected to each wind turbine generator and a substation transformer connecting the wind farm collector system to the electrical grid. A control function may include voltage and real and reactive power commands to the individual wind turbine generators, wherein an algorithm has a technical effect to minimize electrical losses for the wind farm system.

There may be a need for a controller, in particular a controller for controlling a park transformer, for a wind park, and for a control method for controlling a park transformer, wherein an efficiency of energy production and/or supply to the utility grid is improved and wherein at the same time desired or required electrical conditions are satisfied at a point of common coupling, where the wind turbines are connected.

SUMMARY OF THE INVENTION

This need may be met by the subject matter according to the independent claims. Embodiments are described by the dependent claims.

According to an embodiment, a controller (in particular comprising one or more electronic processors, such as a semiconductor chip, one or more input terminals and one or more output terminals for receiving and supplying electrical control signals, the one or more processors being in particular programmable), in particular a controller for controlling a transformation ratio of a park transformer, is provided, wherein the controller is adapted (in particular the controller may be adapted to carry out a control method) to control (in particular via supply of a control signal to the park transformer, wherein the control signal may be an optical signal, an electrical signal or any other signal which may be communicated between the controller and the park transformer) a transformation ratio (in particular specifying a ratio of a primary voltage relative to a secondary voltage or vice versa) of a park transformer (an electrical/electronical device for transforming a primary voltage to a secondary voltage which is different from the primary voltage, wherein the park transformer in particular comprises a primary coil at which the primary voltage is applied and a secondary coil which provides the secondary voltage upon applying the primary voltage at the first coil, wherein in particular the first coil comprises a first wire wound around a ferromagnetic material and the second coil comprises a second wire wound around a ferroelectric material, wherein a magnetic field is generated within the ferromagnetic material upon applying the primary voltage at the primary coil and the secondary voltage is induced due to magnetic flux penetrating through the secondary coil) of a wind turbine park (or a wind turbine farm) comprising a plurality of wind turbines (each wind turbine comprising in particular a wind turbine tower, a nacelle mounted at a top of the wind turbine tower, a rotation shaft rotatably supported within the nacelle and connected on one side to a generator, wherein on another side of the rotation shaft one or more rotor blades are connected which transfer mechanical energy extracted from the wind to the rotation shaft such that the rotation shaft rotates due to the impacting wind, wherein the generator of the wind turbine may in particular be connected to a converter converting the variable frequency energy stream delivered from the generator to a fixed frequency energy stream having a frequency corresponding to the nominal frequency of the utility grid) connected to a first node (also referred to as point of common coupling (PCC) or a medium voltage node), wherein the park transformer is connected between the first node and a second node (the second node may also referred to as the high voltage node and the first node may also be referred to as the medium voltage node, wherein the voltage at the first node may amount to 0.5 kV-1.0 kV and the voltage at the second node may amount to between 20 kV and 50 kV, wherein the second node is connected to a utility grid (to which one or more consumers are connected to receive electrical energy) to which electric energy produced by the wind turbine is to be delivered.

Controlling the transformation ratio of the park transformer allows setting the voltage at the first node and/or setting the voltage at the second node. In particular, the utility grid may have a particular demand for reactive power which may be satisfied by adjusting or controlling the transformation ratio of the park transformer. Thereby, delivering reactive power or absorbing reactive power from the utility grid does not need to be performed by additional components, thus simplifying the wind turbine park and also simplifying the controller.

In particular, embodiments enable to control the quantities reactive power Q, voltage V and/or power factor at the first node or point of common coupling by introducing power system components which are installed in the park.

In particular, the park transformer may allow to set different tap positions corresponding to different transformation ratios, such as 3 to 10 different transformation ratios. Thereby, in particular, the park transformer may be capable of controlling voltage and/or reactive power flow in the wind turbine park, in particular at the point of common coupling. Further, by controlling the transformation ratio also a total active power loss occurring upon transmission of the electric power from the individual wind turbines to the utility grid may be reduced, in particular minimized. In particular, providing the park transformer with an adjustable transformation ratio allows more flexibility for controlling the wind park.

In particular, at the first node or point of common coupling (the medium voltage side of the park transformer) the power produced by the individual wind turbines after feeding them through wind turbine transformers the electrical power portions are all summed and fed through the park transformer which has variable transformation ratio capabilities.

In particular, electrical measurements on the high voltage side and/or the medium voltage side of the park transformer may be performed and sent to the controller, also referred to as wind farm controller or HPPP. In particular, the controller may also distribute voltage set points to the individual wind turbines. In particular, the voltage set points may be supplied to the converters of the wind turbines which may adapt their power outputs corresponding to the voltage set points, as is known in the art. By providing a park transformer having a changeable transformation ratio the way of control of reactive power and voltage may be broadened.

According to an embodiment, the controller is further adapted to control (in particular comprising supply an electrical control signal to the impedance element) at least one impedance element (in particular an electrical/electronical member having a complex impedance such that the impedance element causes shifting a phase between voltage V and current I) connected to the second node or between the park transformer and a wind turbine transformer of at least one wind turbine.

In particular, the impedance element may be connected to the first node in which case only one impedance element may be required. Alternatively, between each wind turbine transformer and the first node an impedance element may be connected. In particular, the closer the impedance element is arranged at the wind turbine transformer the higher the reduction of power loss may be, since the impedance element may alter the energy stream such that transmission loss from the wind turbine to the point of common coupling may be reduced. By controlling at least one impedance element reactive power in particular at the first node may be controlled in a simple manner. Further, reactive power may be controlled by a combination of controlling the transformation ratio of the park transformer and controlling an impedance of the at least one impedance element, in particular stepwise or continuously.

According to an embodiment, the impedance element comprises a capacitor (in particular allowing storing of an electrical charge on two plates or electrodes arranged opposite to each other, wherein in particular a dielectric medium is sandwiched between the two plates or the two electrodes).

In particular, the controller may be adapted to adjust an impedance of the capacitor to generate reactive power, in particular to generate reactive power at the point of common coupling. In particular, the impedance of the impedance element may be controlled in a number of steps corresponding to different values of the impedance of the impedance element. Having the capacitor connected to the wind turbine park as outlined above, enables to use the capacitor to produce a certain amount of reactive power, while lowering the need of reactive power production from converters of the individual wind turbines. Thereby, in particular the total current and thereby transmission loss of the electrical energy produced by the wind turbine may be decreased. According to an embodiment, the impedance of the capacitor may continuously be adjusted.

According to an embodiment, the impedance element comprises an inductor (in particular comprising a coil in particular wound around a ferromagnetic material).

In particular, the inductor may be utilized to absorb reactive power in situations where excess of reactive power is present at the point of common coupling due to large and long transmission lines. In particular, increasing the impedance of the inductor may shift a relative phase between the current I and the voltage V, such that the current I lacks behind the voltage V. In contrast, increasing the impedance of the capacitor may cause a relative shift of the current I relative to the voltage V such that the current I heads ahead of the voltage V.

In particular, the inductor may also referred to as a shunt reactor and the capacitor may also be referred to as a shunt capacitor or capacitor bank.

In particular, the impedance of the shunt reactor or inductor may be adjusted in a stepped manner. In alternative embodiments, the impedance of the shunt reactor is continuously changed.

According to an embodiment, the controller is adapted to control the transformation ratio and/or an impedance of the impedance element based on a measured electrical property (for example voltage, current, power, power factor, impedance or the like) at the first node and/or at the second node.

Thereby, the controller may be connected to one or more measuring instruments or measuring sensors, in particular via one or more electrical lines. Measuring the electrical properties may enable to more accurately perform the controlling.

In particular situations, the voltage at the high voltage side may be kept constant. In order to keep the voltage at the high voltage side constant, the voltage at the high voltage side may be monitored by one or more measuring instruments. If the measuring instrument detects a deviation of the voltage at the high voltage side relative to a nominal voltage at the high voltage side, the controller may accordingly control either the transformation ratio of the park transformer, the impedance of the at least one impedance element or both to cause a decrease of the deviation of the measured voltage at the high voltage side to the nominal voltage at the high voltage side.

According to an embodiment, the controller is adapted to control an impedance of the impedance element such that an amplitude (or magnitude or size) and/or a phase of an impedance of the wind turbine park is altered. In particular, the wind turbine park may be characterized by one or more resonance frequencies (where the impedance is especially high compared to other frequencies) due to the interconnection of plural electronic and electric elements leading to phase-shifts between voltage and current and leading to different impedances for different frequencies. The resonance frequencies may cause problems (in particular damping or power loss), when a distorted power stream also comprises components having frequencies corresponding to the resonance frequencies. Thus, shifting the amplitude and/or phase of an impedance of the wind turbine park may improve the operation of the wind turbine park.

According to an embodiment, the controller is adapted to control the impedance of the impedance element such that the amplitude of the impedance of the wind turbine park at a predetermined frequency is reduced. Thereby, a power loss may be reduced.

According to an embodiment, the controller is adapted to control the transformation ratio and/or an impedance of the impedance element such that a power loss (in particular a difference between power produced by the wind turbines and power delivered to the point of common coupling or to the grid) occurring between the park transformer and a wind turbine transformer of at least one of the plurality of wind turbines is reduced, in particular minimized.

For appropriately controlling the transformation ratio and/or the impedance of the impedance element the controller may employ a (electric/electronic) model of the wind park taking into account the interconnection of different electric and electronic elements causing resonance frequencies, and phase-shifts between voltage and current.

According to an embodiment, a wind park is provided, which comprises a plurality of wind turbines connected to a first node; a park transformer having a changeable transformation ratio, wherein the park transformer is connected between the first node and a second node which is connectable to a utility grid; and a controller according to one of the afore mentioned embodiments, wherein the controller is communicatively connected to the park transformer to control the transformation ratio of the park transformer.

Having the wind park provided with the controller according to an embodiment enables more efficient operation of the wind park. Further, requirements regarding electrical conditions at the medium voltage side and/or the high voltage side of the park transformer may be met.

According to an embodiment, the park transformer comprises a two winding transformer (having for each phase one primary coil and one secondary coil) or a three winding transformer (having for each phase one primary coil and two primary coils). In particular, the wind park may provide the energy stream employing several phases, in particular three phases. In this case for each phase the park transformer comprises two windings, when the park transformer comprises a two winding transformer. When the park transformer comprises a three winding transformer three windings are provided for each of the three phases. Thereby, a conventional transformer may be used, as long as the transformer allows adjustment of its transformation ratio. In particular, the park transformer may allow changing its transformation ratio continuously or in steps, wherein in particular, the transformation ratio may be changed in 5-10 steps. Thereby, the construction of the park transformer may be simplified.

According to an embodiment, the park transformer allows adjusting at least two tap positions corresponding to different values of the transformation ratio. In particular, the park transformer may comprise at least two transformer taps, wherein each transformer tap may comprise a connection point along a transformer winding that allows a certain number of turns to be selected. In particular, the tap selection may be achieved via a tap changer mechanism. In particular, the tap points may take the form of connection terminals, which may in particular be assisted by means of a rotary or slider switch. In particular, during a switch over event the tap transformer may shortly be disconnected from the primary voltage.

It should be understood that features (individually or in any combination) disclosed with respect to an embodiment of a controller may also be applied (individually or in any combination) to a control method according to an embodiment and vice versa.

According to an embodiment, a control method is provided which comprises controlling a transformation ratio of a park transformer of a wind turbine park comprising a plurality of wind turbines connected to a first node, wherein the park transformer is connected between the first node and a second node which is connected to a utility grid to which electric energy produced by the wind turbines is to be delivered.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. References to various embodiments will be described in more detail hereinafter but are not to limit the scope of the invention.

BRIEF DESCRIPTION OF THE DRAWINGS

Embodiments are now described with reference to the accompanying drawings. The invention is not restricted to the illustrated or described embodiments. Like reference numbers denote like elements in structure or function, wherein similar or like elements may differ only in the first digit.

FIG. 7 illustrates graphs of an impedance characteristic of a wind park in different operational states.

DETAILED DESCRIPTION

Figure 1:
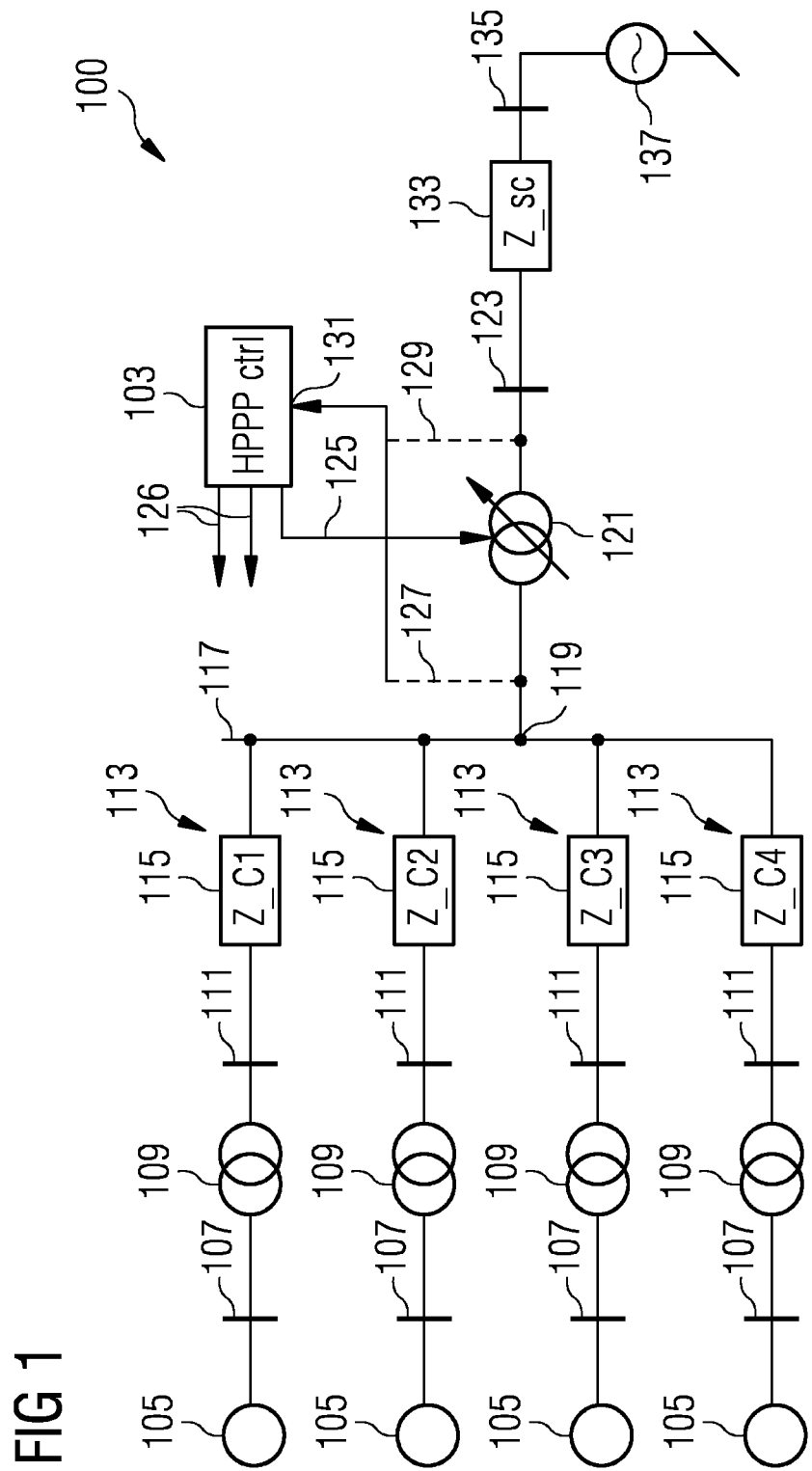
FIG. 1 schematically illustrates a wind park comprising a controller according to an embodiment.

The illustration in the drawings is in schematic form. It is noted that in different figures, similar or identical elements are provided with the same reference signs or with reference signs, which are different from the corresponding reference signs only within the first digit.

FIG. 1 schematically illustrates a wind park 100 according to an embodiment of the present invention comprising a controller 103 according to an embodiment of the present invention. The wind park 100 comprises plural wind turbines 105 from which four wind turbines are illustrated in FIG. 1, but more may be present.

Each wind turbine 105 has a capability of producing power of 2.3 MW. Each wind turbine 105 is connected to a first bus 107 which connects via a cable to a wind turbine transformer 109. The wind turbine transformer transforms the energy stream output from the wind turbine 105 from 0.69 kV to 33 kV. The output of the transformer 109 is connected to a second bus 111 which in turn is connected to a transmission line 113 comprising an impedance 115.

Via a third bus 117 the plural wind turbines 105 are connected to a first node 119 (also referred to as point of common coupling). The first node 119 is located at a medium voltage side of a park transformer 121 which provides an adjustable transformation ratio to transform the medium voltage 33 kV to a high voltage which may amount to up to 132 kV at a second node 123 which may also referred to as high voltage side of the park transformer 121.

According to embodiment of the present invention, the park transformer 121 comprises a tap changer for changing the transformation ratio of the park transformer 121, wherein the tap position is altered in response to a control signal received via the control line 125 from the controller 103. The park transformer 121 is adapted to support a power of 120 MVA. Via measuring lines 127 (connected to the first node 119) and 129 (connected to the second node 123) the controller 103 receives electrical measurement values, such as voltage, frequency, power flow of active power, power flow of reactive power at the first node 119 and/or the second node 123. Based on the electrical measurement values labelled by reference sign 131 the controller 103 derives a control signal and supplies the control signal via the control line 125 to the park transformer 121 in order to adjust the transformation ratio of the park transformer.

Via an impedance 133 and a bus 135 the electrical stream is supplied to a utility grid 137 which is operated at a voltage (a nominal voltage) of 132 kV. One or more consumers are connected to the utility grid 137 and are supplied with electric energy from the utility grid 137.

The controller supplies via control lines 126 other control instructions or commands to the turbines 105.

Figure 2:
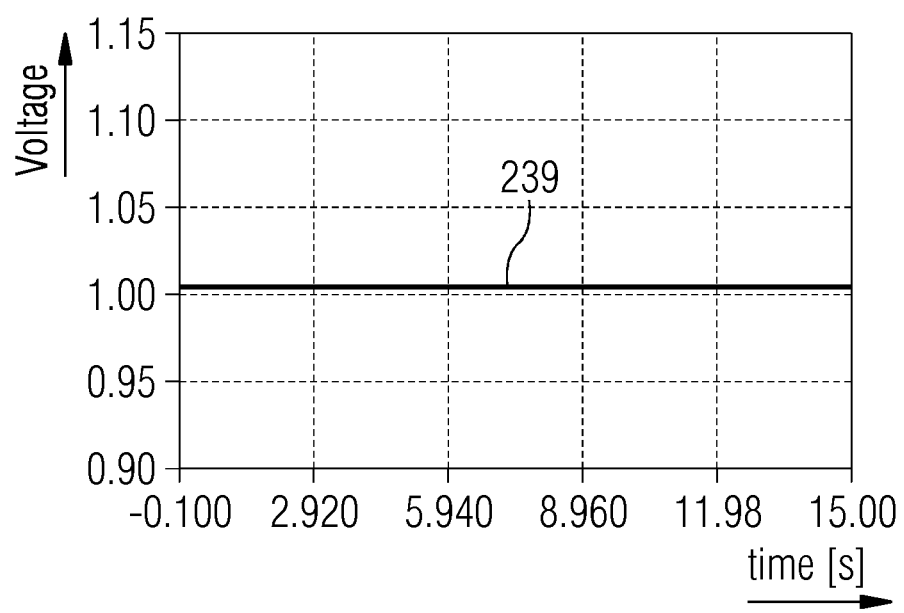
FIGS. 2, 3, 4 illustrate graphs relating to a method according to an embodiment.
Figure 3:
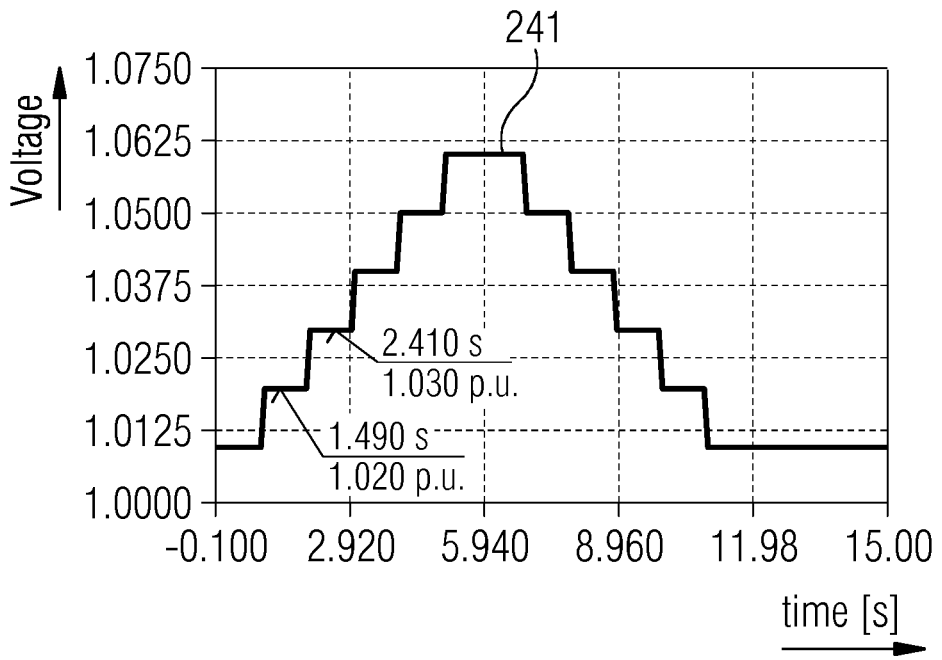
Figure 4:
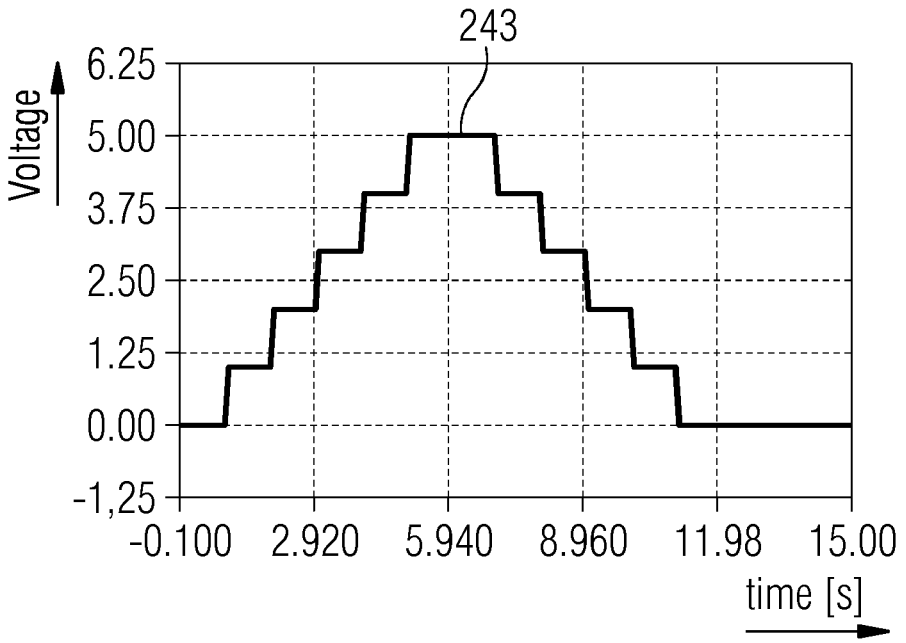

FIGS. 2,3,4 illustrate graphs or plots (time courses, wherein the abscissa denotes the time in seconds s) relating to a control method according to an embodiment of the present invention. Thereby, the plot in FIG. 2 shows (on its ordinate) the voltage 239 per unit on the high voltage side (i.e. at the second node 123) of the park transformer 121 illustrated in FIG. 1.

The plot in FIG. 3 shows (on its ordinate) the voltage 241 per unit at the medium voltage side (i.e. at the first node 119) of the park transformer 121 illustrated in FIG. 1. The lower plot is the tap position 243 which is increased from neutral (0) to max (5) and back to neutral. Each step in tap increases the voltage level on the medium voltage side as illustrated in the curve 241 of the plot of FIG. 3.

The tap control feature provided by the controller 103 illustrated in FIG. 1 may have a significant role with respect to power loss in the wind farm 100 illustrated in FIG. 1. The power loss is given by $P_{loss}=I^2 \times R$. The tap control provided by the controller 103 may be utilized for keeping the high voltage side voltage fixed and increasing the voltage level at the first node 119 or at the wind turbine terminal (e.g. at bus 107 or at bus 111). The magnitude of the electric current may be lower for higher voltage and thereby the active power loss may be minimized. Further, the power may be boosted up in the wind farm using the tap changer, thereby increasing the reactive power production if needed.

In the graph of FIG. 2 the curve 239 illustrates the constant voltage at the second node 123. In the graph of FIG. 3 the curve 241 illustrates the stepwise changed voltage at the medium voltage side (i.e. at the first node 119) of the park transformer 121, wherein the voltage 241 increases stepwise and then decreases stepwise in five steps. The curve 243 in the graph of FIG. 4 illustrates the control signal generated by the controller 103 and supplied via the control line 125 to the park transformer 121, wherein the control signal 243 controls the tap position of the park transformer 121.

Figure 5:
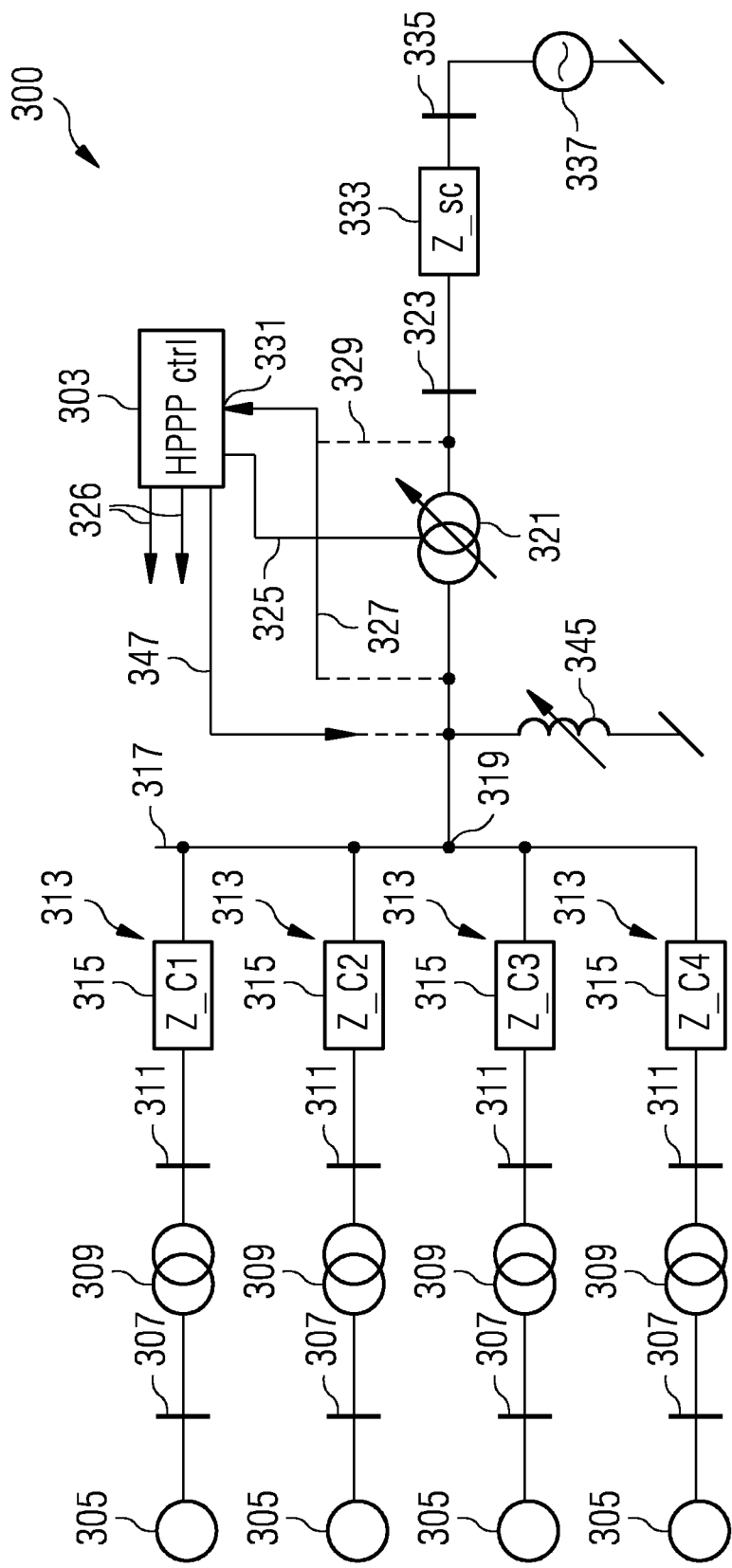
FIG. 5 schematically illustrates a wind park comprising a controller according to another embodiment of the present invention.
Figure 6:
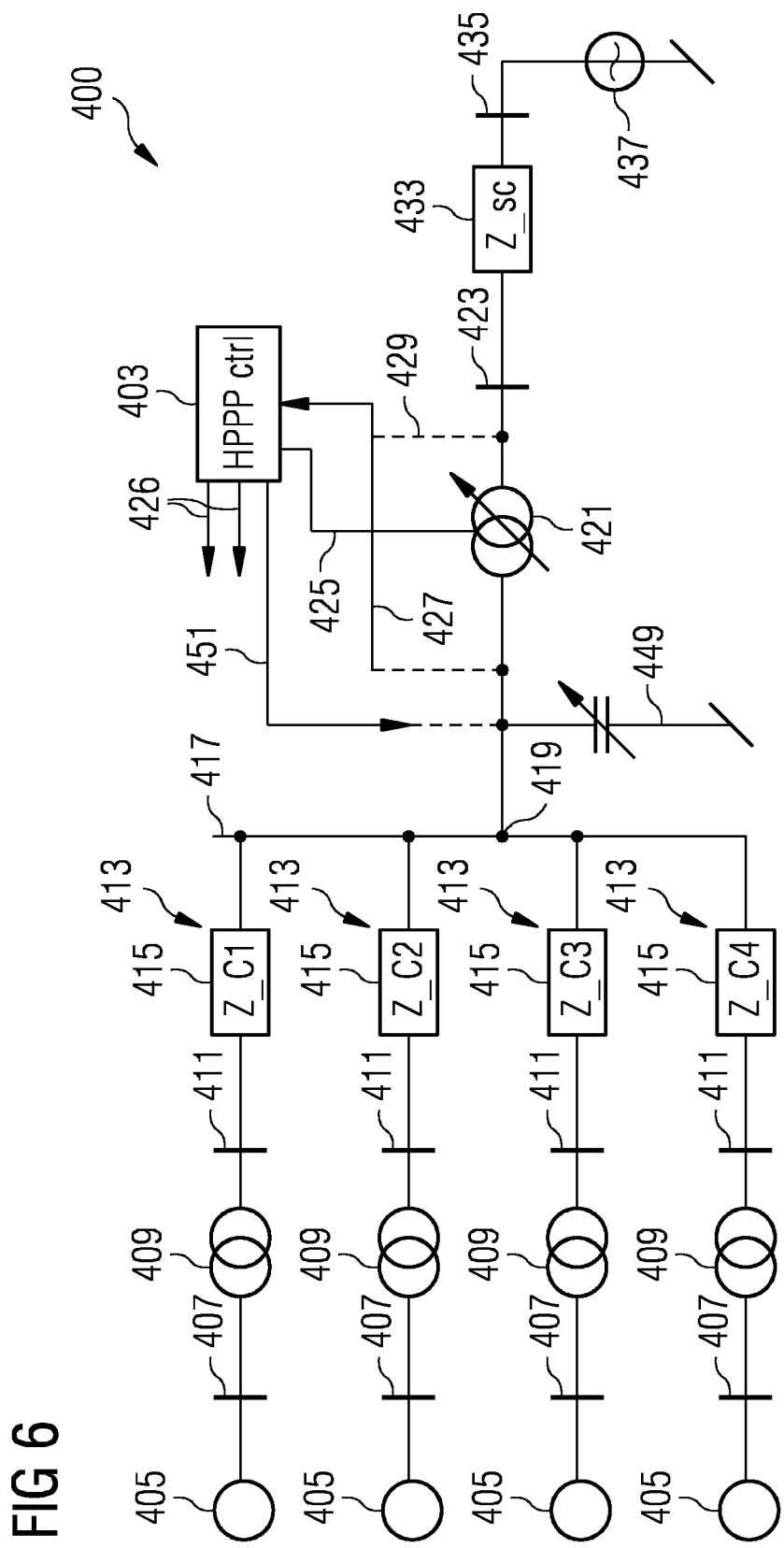
FIG. 6 schematically illustrates a wind park comprising a controller according to still another embodiment of the present invention.

FIG. 5 schematically illustrates a wind park 300 according to an embodiment of the present invention comprising a controller 303 according to an embodiment of the present invention. Since many features or elements of the wind park 300 illustrated in FIG. 5 and also the wind park 400 illustrated in FIG. 6 are similar or even identical to features or elements of the wind park 100 illustrated in FIG. 1 a detailed description of these elements is suppressed and can be taken from the corresponding description of the wind park 100 illustrated in FIG. 1.

Additionally to the wind park 100 illustrated in FIG. 1 the wind park 300 illustrated in FIG. 5 comprises an inductor 345 which is in the illustrated embodiment connected to the first node 319 corresponding to the medium voltage side of the park transformer 321. The inductor 345 is also referred to as a shunt reactor. An impedance of the shunt reactor is controlled via the control line 347 by the controller 303.

The purpose of the shunt reactor 345 is in particular to absorb reactive power in situations, where excess of reactive power is seen at the point of common coupling or first node 319 due for example to large or long transmission lines. It may be required (in particular by a transmission system operator (TSO)) to have for example 80 MVAr at the first node 319, but this value may be exceeded. In such cases the shunt reactor step is to be controlled by the wind farm controller 303 to thereby control the absorbed reactive power. In particular, an impedance of the shunt reactor 345 may be controlled in a continuous manner or a stepwise manner. Thereby, the step size may be controlled by the controller 303. In particular, the shunt reactor 345 may have a number of steps, where each step may refer to a certain amount of absorbed reactive power (or may correspond to a particular value of the impedance).

The location of the shunt reactor 345 may either be at the medium voltage side 319 or the high voltage side (i.e. the second node 323) of the park transformer 321. Further, the shunt reactor 345 may be located anywhere between the first node 319 and each of the individual wind turbines 305. Placing the shunt reactor 345 close to a wind turbine 305 may reduce transmission loss due to transmission of electric energy from the wind turbine 305 to the point of common coupling 319.

The controller 303 also provides a control signal via the control line 325 to the park transformer 321, in order to adjust the transformation ratio of the park transformer 321 in a similar way as is described with reference to FIG. 1.

FIG. 6 schematically illustrates a wind park 400 according to an embodiment of the present invention comprising a controller 403 according to an embodiment of the present invention.

Additionally to the wind park 100 illustrated in FIG. 1 and the wind park 300 illustrated in FIG. 5 the wind park 400 comprises a shunt capacitor 449 which is connected in the illustrated embodiment to the point of common coupling 419. In other embodiments the shunt capacitor 449 may be connected to the second node 423 (i.e. the high voltage side of the park transformer 421). An impedance of the shunt capacitor 449 is controlled via the control line 451 by the controller 403.

The purpose of the shunt capacitor 449 is to generate reactive power in situations, where lack of reactive power is occurring at the point of common coupling 419. It may be required (in particular by a transmission system operator) to have for example 80 MVAr at the point of common coupling 419, but this value may not be reached, because the reactive capability of the converters (not illustrated) of the wind turbine(s) 405 may not large enough. In such a case the shunt capacitor step is to be controlled by the wind farm controller 403 to thereby control the generation of reactive power. In particular, an impedance of the shunt capacitor may be changed in a continuous manner or a stepwise manner. Thereby, the step size may be controlled by the controller 403. In particular, the shunt capacitor may have a number of steps, wherein each step may refer to a certain amount of generated reactive power (or may correspond to a particular impedance value).

The location of the shunt capacitor 449 may be either on the medium voltage side (at the first node 419) or at the high voltage side (at the second node 423) or alternatively on a position between the first node 419 and any of the individual wind turbines 405. The function of the shunt capacitor 449 may be vital, when the reactive capabilities of the converter(s) (not illustrated) of the wind turbines 405 are reached, as it may provide a certain amount of MVAr.

The shunt capacitor may be used, to produce a certain amount of reactive power (measured in MVAr), while lowering the reactive power production from the converters of the wind turbines 405. Thereby, the total current from the wind turbines may be decreased, thereby also lowering the transmission losses. Alternatively, the capacitance may be adjusted by dynamic reactive power system that do not use steps like described above.

As the controller 103 illustrated in FIG. 1 and the controller 303 illustrated in FIG. 5 also the controller 403 illustrated in FIG. 6 supplies via a control line 425 a control signal to the park transformer 421 to control its transformation ratio.

In particular, controlling the park transformer 121, 321, 421, controlling the shunt reactor 349 and controlling the shunt capacitor 449 may be combined in a wind park according to an embodiment of the present invention, which comprises the park transformer having an adjustable transformation ratio, the shunt reactor as well as the shunt capacitor (either connected to the high voltage side or to the low voltage side of the park transformer). In particular, a controller according to an embodiment of the present invention is capable to control all three components and may thereby fulfil some requirements from either a transmission system operator or utility grid customer or provider. Especially, when the wind farm controller can control the shunt reactor and the shunt capacitor, resonance frequencies of the wind park may be altered or moved regarding a position and a magnitude.

FIG. 7 illustrates graphs with two curves showing on the abscissa the frequency and on the ordinate the impedance of a wind park according to an embodiment in two different configurations.

Curve 553 illustrates the impedance characteristics of the wind park 400 illustrated in FIG. 6 without having the shunt capacitor 449 connected to the first node 419. As can be observed from FIG. 7 (curve 553) the impedance characteristics exhibits resonance peaks 553a, 553b, 553c, . . . to show some examples. In particular, the current supplied by the converters of the wind turbines 405 may contain harmonics which align with the resonance peaks of the electrical network having the impedance characteristics illustrated by curve 553. Such coincidence of harmonics with impedance peaks may be undesired, as energy loss may be caused.

Curve 555 illustrates the impedance characteristics of the wind park 400 illustrated in FIG. 6, when the shunt capacitor 449 is connected to the first node 419, wherein the impedance of the shunt capacitor 449 has been properly adjusted. As can be seen from FIG. 7 (curve 555) the peaks 555a, 555b, 555c, to illustrate some examples, have a reduced magnitude compared to the peak 553a, 553b and 553c. Thereby, a power loss at particular frequencies may be reduced, in order to improve the efficiency of the wind park 400.

Alternatively or additionally the controller 103, 303 or 403 may be adapted to use the shunt reactor and/or shunt capacitor to adjust some resonance frequency, as the contribution from the inductance and capacitance may have great influence on the resonance of the wind park.

It should be noted that the term "comprising" does not exclude other elements or steps and that "a" or "an" does not exclude a plurality. While specific embodiments have been described in detail, those with ordinary skill in the art will appreciate that various modifications and alternative to those details could be developed in light of the overall teachings of the disclosure. Elements described in association with different embodiments may be combined. It should also be noted that reference signs in the claims should not be construed as limiting the scope of the claims Accordingly, the particular arrangements disclosed are meant to be illustrative only and not limiting as to the scope of the invention, which is to be given the full breadth of the appended claims, and any and all equivalents thereof.

The invention claimed is:

1. A controller,
   wherein the controller is adapted to control a transformation ratio of a park transformer of a wind turbine park comprising a plurality of wind turbines connected to a first node, wherein the park transformer is connected between the first node and a second node which is connected to a utility grid to which electric energy produced by the wind turbines is to be delivered;
   wherein the controller is further adapted to control at least one impedance element connected to the second node or between the park transformer and a wind turbine transformer of at least one wind turbine; and
   wherein the impedance element comprises an inductor.

2. The controller according to claim 1,
   wherein the impedance element comprises a capacitor.

3. The controller according to claim 2,
   wherein the controller is adapted to adjust an impedance of the capacitor to generate reactive power.

4. The controller according to claim 1,
   wherein the controller is adapted to adjust an impedance of the inductor to absorb reactive power.

5. The controller according to claim 1,
   wherein the controller is adapted to control the transformation ratio and/or an impedance of the impedance element based on a measured electrical property at the first node and/or at the second node.

6. The controller according to claim 1,
   wherein the controller is adapted to control an impedance of the impedance element such that an amplitude and/or a phase of an impedance of the wind turbine park is altered.

7. The controller according to claim 1,
   wherein the controller is adapted to control the transformation ratio and/or an impedance of the impedance element such that a power loss occurring between a wind turbine transformer of at least one of the plurality of wind turbines and the park transformer and reduced.

8. A controller,
   wherein the controller is adapted to control a transformation ratio of a park transformer of a wind turbine park comprising a plurality of wind turbines connected to a first node, wherein the park transformer is connected between the first node and a second node which is connected to a utility grid to which electric energy produced by the wind turbines is to be delivered;
   wherein the controller is further adapted to control at least one impedance element connected to the second node or between the park transformer and a wind turbine transformer of at least one wind turbine; and
   wherein the controller is adapted to control the impedance of the impedance element such that the amplitude of the impedance of the wind turbine park at a predetermined frequency is reduced.

9. The controller according to claim 8,
   wherein the impedance element comprises a capacitor 10. The controller according to claim 8,
    wherein the controller is adapted to adjust an impedance of the capacitor to generate reactive power.

11. The controller according to claim 8,
    wherein the controller is adapted to control the transformation ratio and/or an impedance of the impedance element based on a measured electrical property at the first node and/or at the second node.

12. The controller according to claim 8,
wherein the controller is adapted to control an impedance of the impedance element such that an amplitude and/or a phase of an impedance of the wind turbine park is altered.

13. The controller according to claim 8,
wherein the controller is adapted to control the transformation ratio and/or an impedance of the impedance element such that a power loss occurring between a wind turbine transformer of at least one of the plurality of wind turbines and the park transformer is reduced.

14. A controller,
wherein the controller is adapted to control a transformation ratio of a park transformer of a wind turbine park comprising a plurality of wind turbines connected to a first node, wherein the park transformer is connected between the first node and a second node which is connected to a utility grid to which electric energy produced by the wind turbines is to be delivered;
wherein the controller is further adapted to control at least one impedance element connected to the second node or between the park transformer and a wind turbine transformer of at least one wind turbine; and
wherein the controller is adapted to control the transformation ratio and/or the impedance of the impedance element based on a model of the wind park to reduce the power loss.

15. The controller according to claim 14,
wherein the impedance element comprises a capacitor 16. The controller according to claim 14,
wherein the controller is adapted to adjust an impedance of the capacitor to generate reactive power.

17. The controller according to claim 14,
wherein the controller is adapted to control the transformation ratio and/or an impedance of the impedance element based on a measured electrical property at the first node and/or at the second node.

18. The controller according to claim 14,
wherein the controller is adapted to control an impedance of the impedance element such that an amplitude and/or a phase of an impedance of the wind turbine park is altered.

19. The controller according to claim 14,
wherein the controller is adapted to control the transformation ratio and/or an impedance of the impedance element such that a power loss occurring between a wind turbine transformer of at least one of the plurality of wind turbines and the park transformer is reduced.

* * * * *